March 8, 1955     E. A. PROSSER     2,703,819

ELECTROLYTE LEVEL INDICATOR

Filed March 26, 1954

Inventor
Edwin A. Prosser
By John L. Hutchinson
Attorney

United States Patent Office 2,703,819
Patented Mar. 8, 1955

2,703,819

ELECTROLYTE LEVEL INDICATOR

Edwin A. Prosser, Wheaton, Ill., assignor to The Richardson Company, Melrose Park, Ill., a corporation of Ohio Application March 26, 1954, Serial No. 419,054

4 Claims. (Cl. 136—162)

This invention relates in general to storage batteries of, for example, the lead acid type, and more particularly, to means for indicating different electrolyte levels within the cells of such batteries.

It will be appreciated by those familiar with the battery art that in warmer climates or seasons a portion of the electrolyte of a storage battery may evaporate. When evaporation occurs, the level of the electrolyte may possibly fall below the top of the plates and separators within the battery cell, thereby causing them to dry out. Accordingly, it is desirable to compensate for such evaporation by adding distilled water to the electrolyte within the cell. The addition of distilled water to the electrolyte will, of course, cause the level of the electrolyte to rise from its normal level within the cell, and will, in addition, lower its specific gravity.

There is an advantage in using an electrolyte having a lower specific gravity, in that there is a reduction in the deterioration of the plates and separators by the acid. Thus, when distilled water is added to an electrolyte having the usual specific gravity the acid concentration is decreased and, accordingly, the weaker acid solution will cause less damage to the battery components. Further in warm climates or seasons the very slight decrease in battery capacity due to the decrease in specific gravity of electrolyte is unimportant, for the reason that during such periods power requirements are less than is the case during cold climates or seasons.

It is an object of this invention to provide a battery cell cover having associated therewith means for indicating two dfifierent electrolyte levels.

Another object is to provide a cover of the foregoing type having an invertable insert within its filling well which may be employed in alternate positions, to indicate two different electrolyte levels.

The foregoing objects together with additional objects will become more apparent upon reference to the following specification and the accompanying drawing wherein:

Figure 1 discloses a sectional view of the central portion of a battery cell cover and its associated filling well, together with the electrolyte level indicating means forming a part of this invention.

Figure 1:
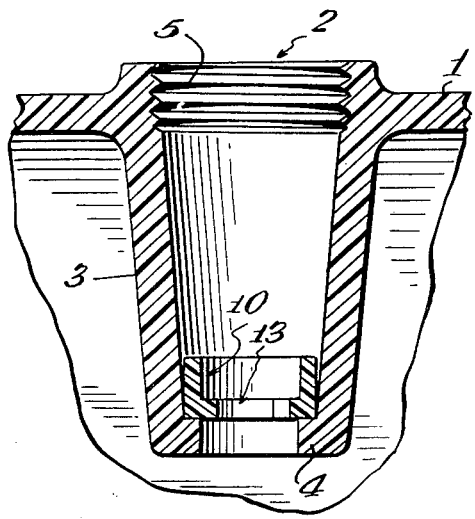
Figure 2:
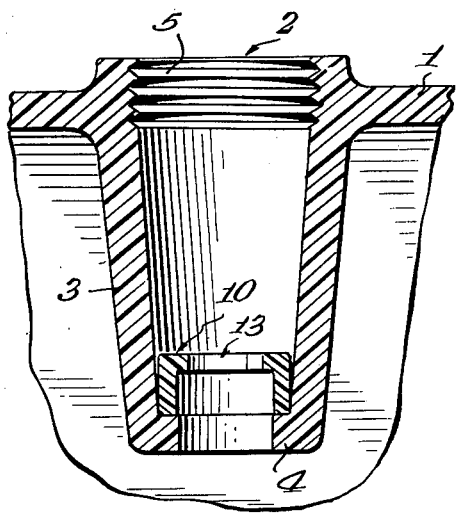
Figure 2 is a view similar to that of Figure 1 with the exception that it discloses the electrolyte level indicating means in a reverse or alternate position.

Referring now to the drawing, and in particular to Figures 1 and 2, the numeral 1 indicates the main body portion of a battery cell cover. The cover is provided with an opening indicated generally by the numeral 2 through which electrolyte may be poured into the cell of a battery. Surrounding the opening and extending downwardly from the cover is a filling well 3.

Provided at the top of the filling well are threads 5 which are adapted to engage corresponding threads on a vent cap, not shown. In the embodiment of the invention illustrated in Figures 1 and 2, the bottom of the filling well 3 is provided with an inwardly extending projection or ledge 4. This ledge, in the preferred form, extends substantially continuously around the inner perimeter of the filling well.

Figure 3:
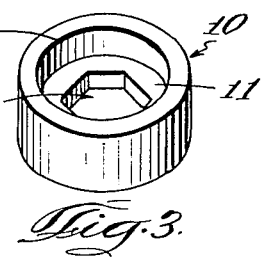
Figure 3 is a perspective of one form of electrolyte level indicating means which may be employed.

A removable cup-like insert 10 is disposed within the filling well and is employed in both of its alternate positions to indicate an electrolyte level. This cup-like insert, as illustrated in Figure 3, comprises a base 11 and an upstanding flange or skirt 12 which extends continuously around the base 11 and is formed integrally therewith. Provided within the base 11 is an opening 13, shown in the drawing as having a hexagonal shape, but which may be formed with any desired configuration, for example, a circle, triangle, etc.

It will be observed that in Figure 1 the base 11 of the insert is shown resting on ledge 4 of the filling well, with the cavity portion of the insert extending upwardly. In such a position the insert will serve to indicate the lower of two desired electrolyte levels, the level being determined by the hexagonal opening 13. When it is desired to add distilled water to the electrolyte of a battery cell up to a second predetermined level, the insert may be inverted as shown in Figure 2. In this latter position it will be seen that the edge of the flange or skirt 12 of the insert, rather than the base 11, now rests on ledge 4, and the level indicator 13 is in a relatively higher position to indicate the desired upper electrolyte level. The height of the skirt 12 will, of course, determine the distance between levels of the electrolyte.

Figure 4:
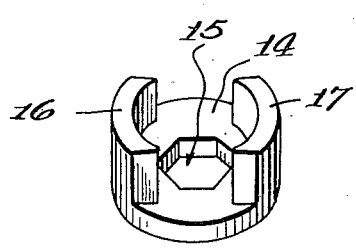
Figure 4 illustrates a modified form of an electrolyte level indicating means.

Figure 4 illustrates a modified form of the insert which may be employed in accordance with the present invention. This modified form includes a base 14 provided with an opening 15, which, as previously indicated, may have any desired configuration. Instead of employing a continuous skirt extending upwardly from the base, two or more projections, such as 16 and 17, are provided, the same being formed integrally with the base 14. It will be readily seen that this modified form of insert, as illustrated in Figure 4, may be utilized in the same manner as is the first embodiment described hereinabove.

Appropriate instructions may be applied to both sides of each of the bases 11 and 14 of the insert, for the purpose of indicating the correct position of the inserts within the filling well 3, and correspondingly the desired electrolyte level. For example, instructions such as "This Side Up in Summer" and "This Side Up in Winter" may be applied to opposite sides of the bases 11 and 14; the first phrase being applied to the outside of the base and the second being applied to the inside. The set of instructions which is uppermost will be visible through the opening 2 whenever the vent cap is removed.

Figure 5:
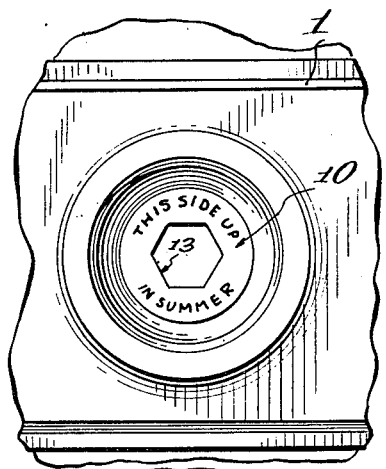
Figure 5 is a fragmentary plan disclosing the electrolyte level indicating means in position within the filling well of a battery cell cover.

Figure 5 illustrates the insert in position within the filling well as seen when looking down into the well through the opening 2. In this figure the insert is disposed in the filling well in inverted position, as illustrated in Figure 2, and will serve to indicate the higher of two electrolyte levels.

The insert of the present invention is, preferably, molded from an appropriate plastic composition of a type similar to that which is generally used for making the battery housing. The specific gravity of the insert should be greater than that of the electrolyte.

Summarizing the utility of the invention, it will be seen that in cold seasons or climates the cup-like insert may be disposed in the filling well, as shown in Figure 1, and the level of the electrolyte in a battery cell may be adjusted up to the opening 13. For warmer conditions the cup-like insert can be inverted within the well as shown in Figure 2, and distilled water added to the electrolyte of a battery cell until the electrolyte level has again reached the opening 13. The opening 13 serves to indicate both the upper and lower levels desired for electrolyte within a cell.

While I have shown and described certain exemplary embodiments of my invention, the same is only intended to be limited by the scope of the following claims.

I claim:

1. In combination, a storage battery cell cover provided with an opening, a filling well surrounding said opening and extending downwardly from said cover, an invertable cup-like member having an aperture in the bottom thereof disposed within said well, said member being adapted to indicate different electrolyte levels when in alternate positions; and means within said well for supporting said member in each of its alternate positions.

2. In combination, a storage battery cell cover provided with an opening, a filling well surrounding said opening and extending downwardly from said cover, a ledge extending along the inner perimeter of said well; and an invertable cup-like member having an aperture in the bottom thereof disposed within said well and supported by said ledge, said member being adapted to indicate different electrolyte levels when in alternate positions.

3. In combination, a storage battery cell cover provided with an opening, a filling well surrounding said opening, and extending downwardly from said cover, a ledge extending along the inner perimeter of said well; and an invertable insert disposed within the well, said insert being supported by said ledge and adapted to indicate different electrolyte levels when in alternate positions; said insert comprising a base provided with an aperture, and an upstanding skirt attached to and extending continuously around said base.

4. In combination, a storage battery cell cover provided with an opening, a filling well surrounding said opening and extending downwardly from said cover, a ledge extending along the inner perimeter of said well, and an invertable insert disposed within the well, said insert being supported by said ledge and adapted to indicate different electrolyte levels when in alternate positions, said insert comprising a base provided with an aperture, and upstanding projections attached to said base.

References Cited in the file of this patent

UNITED STATES PATENTS

| | | |
|---|---|---|
| 2,123,479 | Spencer | July 12, 1938 |
| 2,590,960 | Gray | Apr. 1, 1952 |
| 2,592,743 | Rule | Apr. 15, 1952 |
| 2,643,279 | Bradley | June 23, 1953 |